(12) United States Patent
Uraoka et al.

(10) Patent No.: US 11,267,444 B2
(45) Date of Patent: Mar. 8, 2022

(54) BRAKE CONTROL DEVICE

(71) Applicant: ADVICS CO., LTD., Kariya (JP)

(72) Inventors: Terushige Uraoka, Kariya (JP); Keita Nakano, Hamamatsu (JP); Tatsuya Urano, Okazaki (JP)

(73) Assignee: ADVICS CO., LTD., Kariya (JP)

( * ) Notice: Subject to any disclaimer, the term of this patent is extended or adjusted under 35 U.S.C. 154(b) by 250 days.

(21) Appl. No.: 16/335,317

(22) PCT Filed: Sep. 22, 2017

(86) PCT No.: PCT/JP2017/034264
§ 371 (c)(1),
(2) Date: Mar. 21, 2019

(87) PCT Pub. No.: WO2018/056392
PCT Pub. Date: Mar. 29, 2018

(65) Prior Publication Data
US 2020/0017081 A1    Jan. 16, 2020

(30) Foreign Application Priority Data

Sep. 23, 2016 (JP) .............................. JP2016-186044

(51) Int. Cl.
*B60T 8/17* (2006.01)
*B60T 13/58* (2006.01)
*B60T 13/74* (2006.01)

(52) U.S. Cl.
CPC .............. *B60T 8/17* (2013.01); *B60T 13/588* (2013.01); *B60T 13/741* (2013.01)

(58) Field of Classification Search
CPC ........ B60T 8/17; B60T 13/588; B60T 13/741; B60T 13/74; B60T 7/12
See application file for complete search history.

(56) References Cited

U.S. PATENT DOCUMENTS 8,494,745 B2    7/2013  Schneider et al.
2011/0240418 A1*  10/2011  Tachiiri ..................... B60T 7/12
                                                             188/72.4
(Continued)

FOREIGN PATENT DOCUMENTS

CN    104837697 A  *  8/2015  ............ B60T 8/3265
DE    102006029667 B4  *  6/2015  ............ B60T 13/746

OTHER PUBLICATIONS

International Search Report (PCT/ISA/210) dated Dec. 26, 2017, by the Japan Patent Office as the International Searching Authority for International Application No. PCT/JP2017/034264.
(Continued)

*Primary Examiner* — James M McPherson
*Assistant Examiner* — Kyle J Kingsland
(74) *Attorney, Agent, or Firm* — Buchanan Ingersoll & Rooney PC

(57) ABSTRACT

The brake control device controls a hydraulic brake to generate hydraulic braking force on both the front and rear wheels of a four-wheel-drive vehicle, and an electrical parking brake to generate parking brake force, different from the hydraulic braking force, on the front or rear wheels. The brake control device includes: a detection unit that detects parking brake operation for causing the electrical parking brake to generate a parking brake force; and a control unit for reducing the hydraulic braking force generated on the front wheels or the rear wheels and adjusting the hydraulic braking force on the other of the front wheels or the rear wheels to a magnitude allowing a stationary vehicle state to be maintained, before a parking brake force is generated by the electrical parking brake, when a parking brake operation is detected while a stationary state is being maintained solely by the hydraulic braking force.

6 Claims, 4 Drawing Sheets

(56) References Cited

U.S. PATENT DOCUMENTS

| | | | |
|---|---|---|---|
| 2013/0192937 A1* | 8/2013 | Furuyama | B60T 13/66 188/72.6 |
| 2013/0226425 A1* | 8/2013 | Oliveira | B60T 7/122 701/70 |
| 2016/0052494 A1* | 2/2016 | Yamamoto | B60T 8/4872 701/70 |

OTHER PUBLICATIONS

Written Opinion (PCT/ISA/237) dated Dec. 26, 2017, by the Japan Patent Office as the International Searching Authority for International Application No. PCT/JP2017/034264.

* cited by examiner

BRAKE CONTROL DEVICE

TECHNICAL FIELD

The present invention relates to a brake control device.

BACKGROUND ART

In the related art, there is proposed a technology of reducing a hydraulic braking force during an operation of an electric parking brake, in order to decrease a load due to overlapped generation of the hydraulic braking force by a hydraulic brake and a parking brake force by the electric parking brake on predetermined vehicle wheels.

CITATION LIST

Patent Document

Patent Document 1: U.S. Pat. No. 8,494,745

SUMMARY OF THE INVENTION

Technical Problem

However, in the technology of the related art described above, when a timing at which the hydraulic braking force is reduced and a timing at which the parking brake force is generated are not appropriately set, the hydraulic braking force and the parking brake force are not optimally distributed to the predetermined vehicle wheels. In addition, it is not possible to maintain a stationary state of the vehicle due to an insufficient brake force, or a redundant hardware load remains due to an excessive brake force, in some cases.

In this respect, an object of the invention is to provide a brake control device that is capable of reducing a load due to overlapped generation of a hydraulic braking force and a parking brake force on a predetermined vehicle wheel while a stationary state is more reliably maintained.

Solution to Problem

A brake control device according to the invention is for controlling, for example, a hydraulic brake capable of generating a hydraulic braking force on both front and rear wheels of a four-wheel-drive vehicle and an electric parking brake capable of generating a parking brake force, which is different from the hydraulic braking force, on the front wheels or the rear wheels, the brake control device including: a detection unit for detecting a parking brake operation for causing the electric parking brake to generate a parking brake force; and a control unit for reducing the hydraulic braking force generated on the front wheels or the rear wheels and adjusting the hydraulic braking force generated on the other of the front wheels or the rear wheels to a magnitude that allows a stationary state of the vehicle to be maintained, before the parking brake force is generated by the electric parking brake, when the parking brake operation is detected while a stationary state is being maintained solely by the hydraulic braking force generated on both the front and rear wheels. In this configuration, even when the hydraulic braking force of the front wheels or the rear wheels is zero, for example, it is possible to maintain the stationary state solely by the hydraulic braking force of the other of the front wheels or the rear wheels. Hence, it is possible to decrease a load due to overlapped generation of the hydraulic braking force and the parking brake force on the predetermined vehicle wheels (the front wheels or the rear wheels) while the stationary state is more reliably maintained.

In the brake control device, for example, the control unit causes the electric parking brake to generate the parking brake force after the hydraulic braking force generated on the front wheels or the rear wheels is reduced to zero. In this configuration, it is possible to more reliably avoid the overlapped generation of the hydraulic braking force and the parking brake force on the front wheels or the rear wheels.

In addition, in the brake control device, for example, the control unit cancels control of reducing the hydraulic braking force generated on the front wheels or the rear wheels and control of adjusting the hydraulic braking force generated on the other of the front wheels or the rear wheels, when a magnitude of the parking brake force reaches a magnitude that allows the stationary state to be maintained solely by the parking brake force. In this configuration, the control of reducing the hydraulic braking force of the front wheels or the rear wheels is canceled, and thereby it is possible to decrease an unnecessary control burden. In addition, the control of adjusting the hydraulic braking force of the other of the front wheels or the rear wheels is canceled, and thereby it is possible to limit applying of an unnecessary load on a brake mechanism of the other of the front wheels or the rear wheels.

In addition, in the brake control device, for example, the control unit omits adjustment of the hydraulic braking force generated on the other of the front wheels or the rear wheels and decreases the hydraulic braking force generated on the front wheels or the rear wheels when the magnitude of the hydraulic braking force generated on the other of the front wheels or the rear wheels is equal to or larger than the magnitude that allows the stationary state to be maintained, in a case where the parking brake operation is detected while the stationary state is being maintained solely by the hydraulic braking force. In this configuration, the hydraulic braking force of the other of the front wheels or the rear wheels is not adjusted, when the sufficient hydraulic braking force is already secured to maintain the stationary state. Hence, it is possible to decrease the unnecessary control burden.

MODE FOR CARRYING OUT THE INVENTION

Hereinafter, an embodiment of the invention will be described with reference to the drawings. A configuration of the embodiment to be described hereinafter and an operation and a result (effect) to be achieved by the configuration are only examples and are not limited to the content of the following description.

Figure 1:
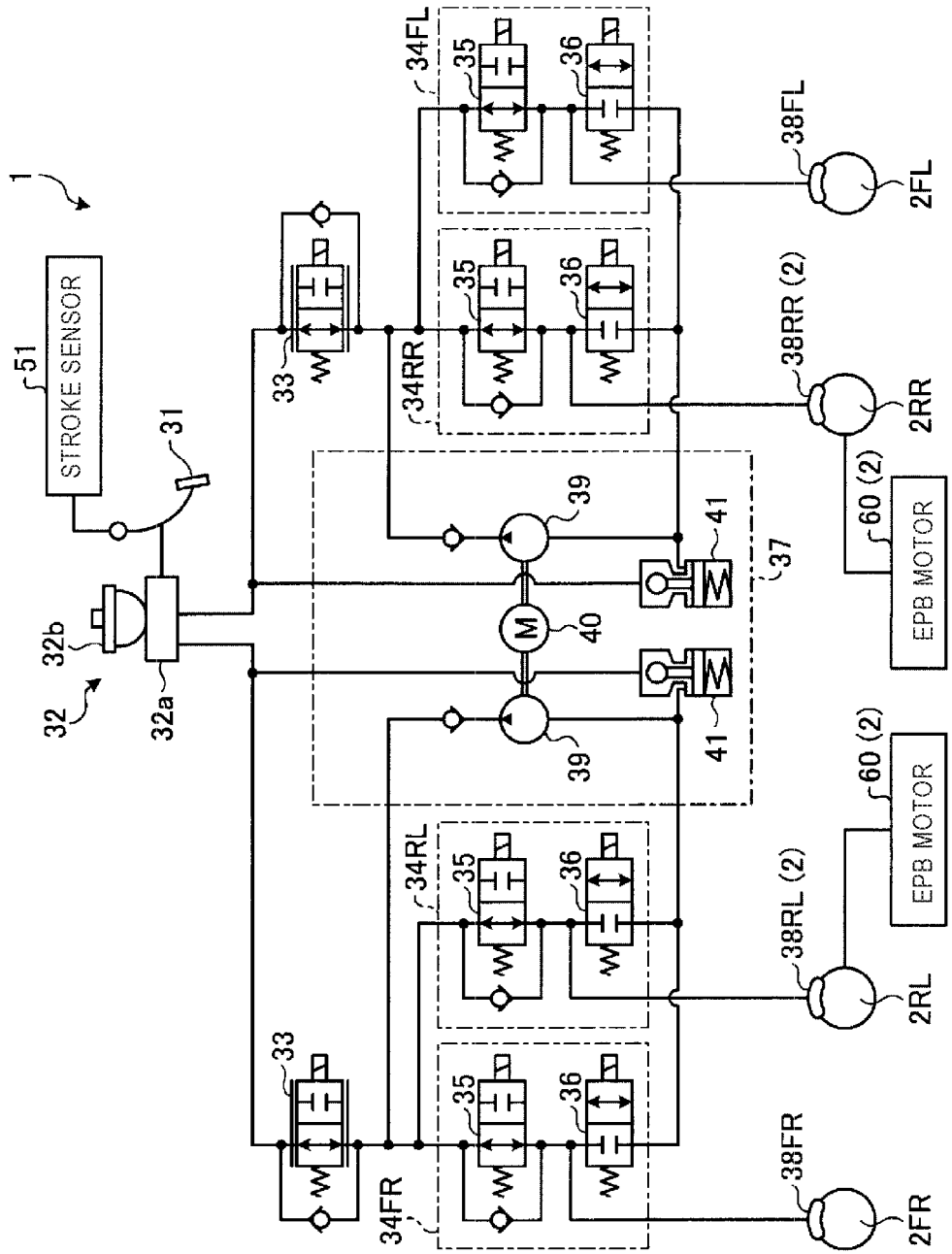
FIG. 1 is an exemplary configurational diagram illustrating a schematic configuration of a brake device that is a control target of a brake control device according to an embodiment.

FIG. 1 is an exemplary configurational diagram illustrating a schematic configuration of a brake device that is a control target of a brake control device 100 (not illustrated in FIG. 1 and refer to FIG. 2 to be described below) according to an embodiment. This brake device is provided in a general-purpose four-wheel-drive vehicle, for example.

As illustrated in FIG. 1, the brake device according to the embodiment includes a hydraulic brake 1 configured to be capable of applying a braking force (friction braking torque) on both vehicle wheels 2FL and 2FR as front wheels and vehicle wheels 2RL and 2RR as rear wheels and an electric parking brake 2 configured to be capable of applying a braking force only on the vehicle wheels 2RL and 2RR as rear wheels. Hereinafter, when it is necessary to distinguish the braking force generated by the hydraulic brake 1 from the braking force generated by the electric parking brake 2, the former is referred to as a hydraulic braking force, and the latter is referred to as a parking brake force.

The hydraulic brake 1 includes a pressure generating unit 32, wheel cylinders 38FL, 38FR, 38RL, and 38RR, pressure adjusting units 34FL, 34FR, 34RL, and 34RR, and a recirculation mechanism 37. The pressure generating unit 32 is configured to generate pressure (hydraulic pressure) in response to an operation of a brake pedal 31 by a driver of the vehicle. The wheel cylinders 38FL, 38FR, 38RL, and 38RR are mechanisms that pressurize respective friction braking members, thereby, applying braking forces on the vehicle wheels 2FL, 2FR, 2RL, and 2RR, respectively. The pressure adjusting units 34FL, 34FR, 34RL, and 34RR are mechanisms that adjust hydraulic pressure which is applied on the wheel cylinders 38FL, 38FR, 38RL, and 38RR. The recirculation mechanism 37 is a mechanism that causes a fluid (hydraulic fluid) as a medium which generates hydraulic pressure to return to an upstream side.

More specifically, the pressure generating unit 32 includes a master cylinder 32a and a reservoir tank 32b. The master cylinder 32a is pushed according to the operation (stepping) of the brake pedal 31, and thereby a fluid replenished from the reservoir tank 32b is discharged to two discharge ports. The two discharge ports are connected to the pressure adjusting unit 34FR on a front side and the pressure adjusting unit 34RL on a rear side and the pressure adjusting unit 34FL on the front side and the pressure adjusting unit 34RR on the rear side, via solenoid valves 33 that are electrically switchable between an opened state and a closed state. Incidentally, the solenoid valve 33 is opened and closed under control of the brake control device 100 (refer to FIG. 2) to be described below.

In addition, each of the pressure adjusting units 34FL, 34FR, 34RL, and 34RR includes solenoid valves 35 and 36 that are switchable between the opened state and the closed state. The solenoid valves 35 and 36 are provided between the solenoid valve 33 and a reservoir 41. The solenoid valve 35 is connected to the solenoid valve 33, and the solenoid valve 36 is connected to the reservoir 41.

The solenoid valves 35 and 36 are opened and closed under control of the brake control device 100 (refer to FIG. 2), and thereby pressure generated by the wheel cylinders 38FL, 38FR, 38RL, and 38RR can be increased, maintained, or decreased. Incidentally, the wheel cylinder 38FL is connected between the solenoid valves 35 and 36 of the pressure adjusting unit 34FL, and the wheel cylinder 38FR is connected between the solenoid valves 35 and 36 of the pressure adjusting unit 34FR. In addition, the wheel cylinder 38RL is connected between the solenoid valves 35 and 36 of the pressure adjusting unit 34RL, and the wheel cylinder 38RR is connected between the solenoid valves 35 and 36 of the pressure adjusting unit 34RR.

The recirculation mechanism 37 includes reservoirs 41, pumps 39, and a pump motor 40 that rotates the pumps 39 on the front side and the rear side and transmits the fluid to the upstream side. The reservoirs 41 and the pumps 39 are provided corresponding to a combination of the pressure adjusting units 34FR and 34RL and a combination of the pressure adjusting units 34FL and 34RR, respectively.

Incidentally, the hydraulic brake 1 includes a stroke sensor 51 that is capable of detecting an operation amount (stroke) of the brake pedal 31, a pressure sensor (not illustrated in FIG. 1) that is capable of detecting pressure which is generated by the master cylinder 32a, or the like.

Here, in the embodiment, an electric parking brake (EPB) motor 60 that is driven under control of the brake control device 100 (refer to FIG. 2) is connected to each of the wheel cylinders 38RL and 38RR on the rear side. Consequently, in the embodiment, the friction braking members of the wheel cylinders 38RL and 38RR on the rear side are pressurized depending on drive of the EPB motor 60, and thereby the braking force is applied to the vehicle wheels 2RL and 2RR as the rear wheels. Hence, in the embodiment, the wheel cylinders 38RL and 38RR on the rear side and the two EPB motors 60 connected to the two wheel cylinders 38RL and 38RR function as the electric parking brake 2 that is capable of generating the parking brake force different from the hydraulic braking force by the hydraulic brake 1.

However, in a vehicle including the hydraulic brake 1 and the electric parking brake 2, a driver appropriately uses an operation of generating the hydraulic braking force by the hydraulic brake 1 (hydraulic brake operation) and an operation of generating the parking brake force by the electric parking brake 2 (parking brake operation), and thereby the driver can generate appropriate braking force on the vehicle depending on a state. For example, in a state in which only the hydraulic brake operation causes the vehicle to come into a stationary state, and then sufficient parking brake force is obtained through the parking brake operation, the stationary state is maintained as is, even when the hydraulic brake operation is canceled such that the hydraulic braking force is zero.

In the related art, there is proposed a technology of reducing the hydraulic braking force generated on the rear wheels, during an operation of the electric parking brake 2, in order to decrease a load due to overlapped generation of the hydraulic braking force and the parking brake force on predetermined vehicle wheels (rear wheels in the embodiment). However, in the technology of the related art described above, when a timing at which the hydraulic braking force is reduced and a timing at which the parking brake force is generated are not appropriately set, the hydraulic braking force and the parking brake force are not optimally distributed to the rear wheels. In addition, it is not possible to maintain a stationary state of the vehicle due to an insufficient brake force, or a redundant hardware load remains due to an excessive brake force, in some cases.

In this respect, the brake control device 100 according to the embodiment avoids bringing about a state in which the brake force is insufficient in the stationary state, based on a configuration to be described below, and thereby a load that is applied to a brake mechanism due to the overlapped generation of the hydraulic braking force and the parking brake force on the predetermined vehicle wheels (the rear wheels in the embodiment) is decreased while the stationary state of the vehicle is more reliably maintained.

Figure 2:
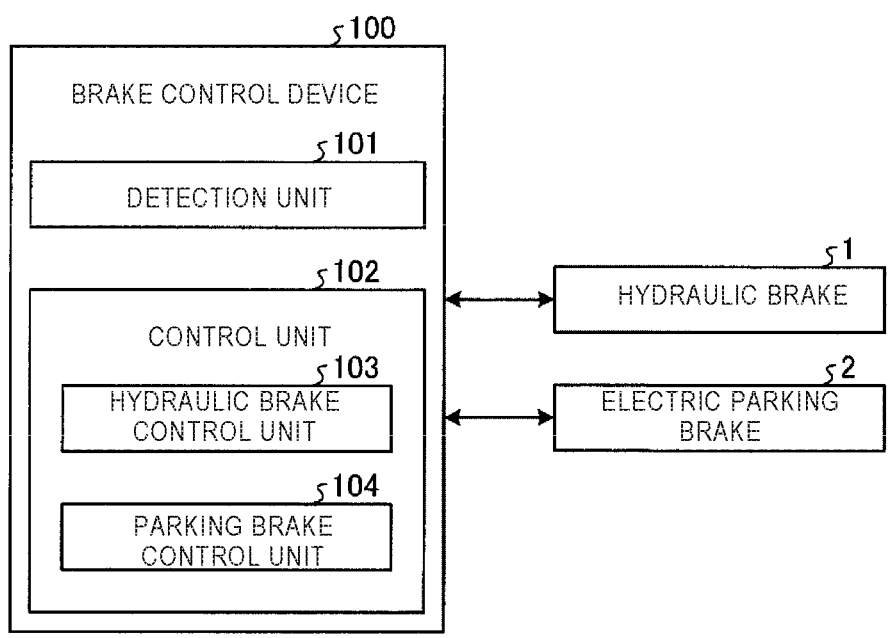
FIG. 2 is an exemplary block diagram illustrating a functional configuration of the brake control device according to the embodiment.

FIG. 2 is an exemplary block diagram illustrating a functional configuration of the brake control device 100 according to the embodiment. For example, the brake control device 100 configures a part of a brake electronic control unit (ECU) including hardware that is similar to a normal computer such as a processor or a memory. Incidentally, the brake control device 100 may be integrated with the other part of the brake ECU or may be configured separately from the other part thereof.

As illustrated in FIG. 2, the brake control device 100 is configured to be capable of controlling the hydraulic brake 1 and the electric parking brake 2. More specifically, the brake control device 100 includes, as a functional configuration, a detection unit 101 and a control unit 102 provided with a hydraulic brake control unit 103 and a parking brake control unit 104. The hydraulic brake control unit 103 is configured to be capable of controlling the hydraulic braking force generated on the hydraulic brake 1. In addition, the parking brake control unit 104 is configured to be capable of controlling the parking brake force that is generated by the electric parking brake 2. For example, a processor of the brake control device 100 executes various programs stored in a memory. As a result, the functional configurations are realized. Incidentally, in the embodiment, a part or the entirety of the functional configurations may be realized by a dedicated circuit or the like.

The detection unit 101 detects a brake operation by a driver, the brake operation such as an operation (hydraulic brake operation) for causing the hydraulic brake 1 to generate the hydraulic braking force or an operation (parking brake operation) for setting a state in which it is possible to generate the parking brake force. For example, the hydraulic brake operation means an operation of the brake pedal 31 by the driver. For example, the parking brake operation means an operation of an EPB switch, a lever, or the like (not illustrated in FIG. 1) which is provided on the vicinity of a driver seat. The detection unit 101 detects the hydraulic brake operation based on a detection result of a stroke sensor 51 or the like and detects the parking brake operation based on an electric signal or the like which is output depending on the operation of the EPB switch, the lever, or the like.

The control unit 102 reduces the hydraulic braking force generated on the rear wheels and adjusts the hydraulic braking force generated on the front wheels to a magnitude that allows the stationary state of the vehicle to be maintained, before the parking brake force is generated by the electric parking brake 2, when the parking brake operation is detected while the stationary state is being maintained solely by the hydraulic braking force generated on both the front and rear wheels. In other words, the control unit 102 increases the hydraulic braking force of the front wheels so as to supplement a shortage of the brake force when the brake force is insufficient to the extent that it is not possible to maintain the stationary state of the vehicle due to the reduction of the hydraulic braking force of the rear wheels. Consequently, even when the hydraulic braking force of the rear wheels is zero, for example, it is possible to maintain the stationary state solely by the hydraulic braking force of the front wheels. Hence, it is possible to decrease a load that is applied to a brake mechanism of the rear wheels on which the hydraulic braking force and the parking brake force are generated in an overlapped manner while the stationary state of the vehicle is more reliably maintained.

Thus, the control unit 102 causes the electric parking brake 2 to generate the parking brake force after the hydraulic braking force generated on the rear wheels is reduced to zero. Consequently, it is possible to more reliably avoid the overlapped generation of the hydraulic braking force and the parking brake force on the rear wheels. Incidentally, the control unit 102 may control a timing at which the EPB motor 60 of the electric parking brake 2 is driven such that a timing at which the hydraulic braking force generated on the rear wheels is reduced to zero coincides with a timing at which the parking brake force starts to be generated. As described above, the control of the timings allows a rapid transition from the stationary state solely by the hydraulic braking force to the stationary state solely by the parking brake force.

Further, the control unit 102 cancels control of reducing the hydraulic braking force generated on the rear wheels and control of adjusting the hydraulic braking force generated on the front wheels, when the magnitude of the parking brake force reaches a magnitude that allows the stationary state to be maintained solely by the parking brake force. Consequently, the control of reducing the hydraulic braking force of the rear wheels is canceled, and thereby it is possible to decrease an unnecessary control burden. In addition, the control of adjusting the hydraulic braking force of the front wheels is canceled, and thereby it is possible to limit applying of an unnecessary load to a brake mechanism of the front wheels. Incidentally, in general, after the parking brake force is increased to the magnitude that allows the stationary state to be maintained and is maintained, the mechanisms of the hydraulic brake 1 and the electric parking brake 2 do not allow the hydraulic braking force in response to the hydraulic brake operation to be added to the parking brake force and to be generated as a load on the rear wheels, even when the driver performs the hydraulic brake operation. Hence, in a state in which it is possible to maintain the stationary state solely by the parking brake force, the load that is applied to the brake mechanism of the rear wheels does not increase, even when the control of reducing the hydraulic braking force generated on the rear wheels is ended.

Incidentally, the control unit 102 omits adjustment of the hydraulic braking force generated on the front wheels and decreases the hydraulic braking force generated on the rear wheels when the magnitude of the hydraulic braking force generated on the front wheels is equal to or larger than the magnitude that allows the stationary state to be maintained, in a case where the parking brake operation is detected while the stationary state is being maintained solely by the hydraulic braking force. Consequently, the hydraulic braking force of the front wheels is not adjusted, when the sufficient hydraulic braking force is already secured to maintain the stationary state. Hence, it is possible to decrease the unnecessary control burden.

In the configuration described above, the control unit 102 according to the embodiment controls the hydraulic brake 1 and the electric parking brake 2 such that, as an example, the loads that are applied to the front wheels and the rear wheels change in accordance with a timing chart to be described below.

Figure 3:
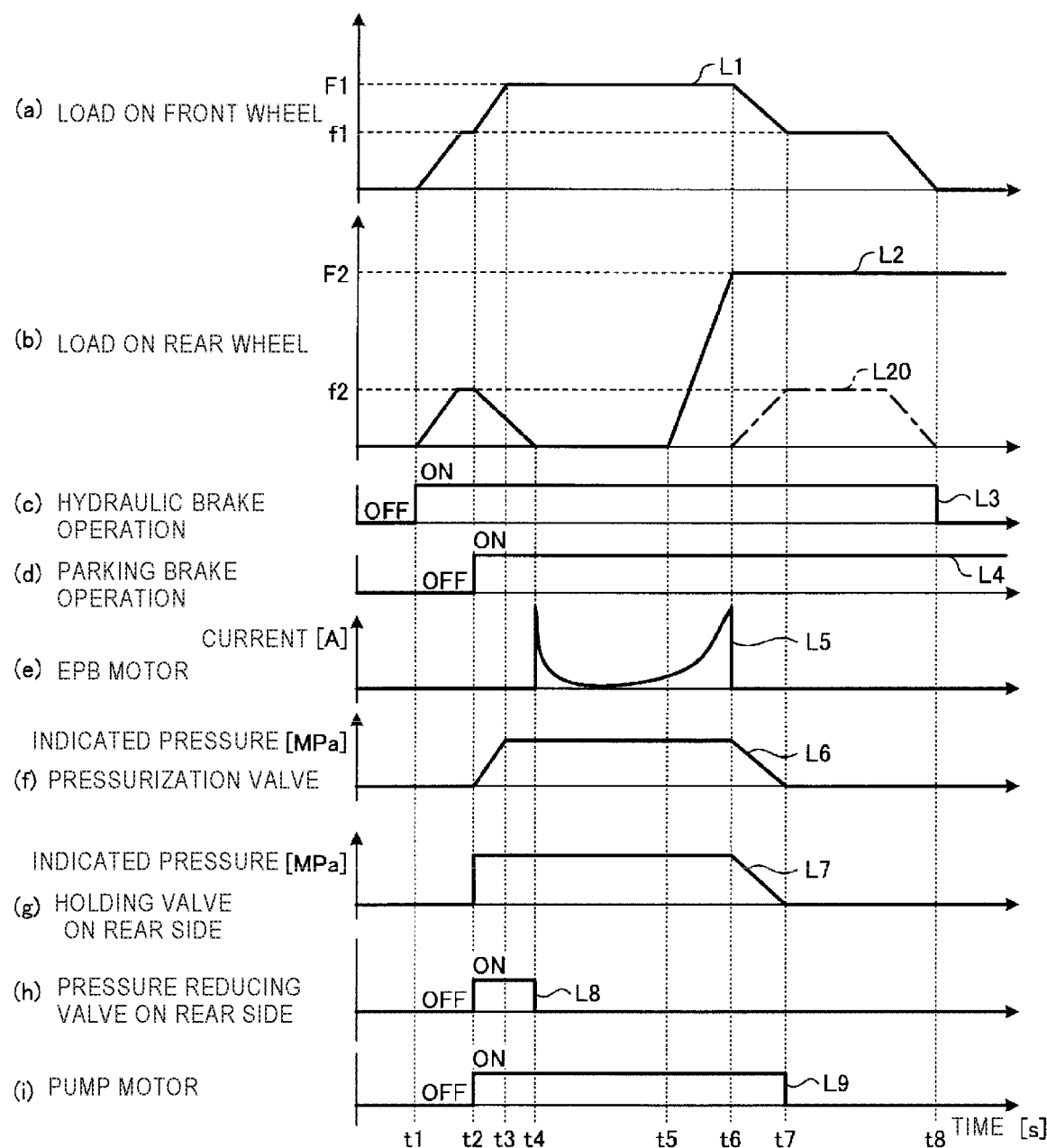
FIG. 3 is an exemplary timing chart illustrating an example of a change in load that is applied to front wheels and rear wheels, which is realized in the embodiment.

FIG. 3 is an exemplary timing chart illustrating an example of a change in load that is applied to the front wheels and the rear wheels, which is realized in the embodiment. Incidentally, in FIG. 3, (a) illustrates a time change of the load on the front wheels, and (b) illustrates a time change of the load on the rear wheels. In addition, in FIG. 3, (c) illustrates a time change of presence and absence (ON/OFF) of the hydraulic brake operation, and (d) illustrates a time change of presence and absence (ON/OFF) of the parking brake operation. In addition, in FIG. 3, (e) illustrates a time change of a current that is output to the EPB motor 60 depending on the parking brake operation. In addition, in FIG. 3, (f) illustrates a time change of an indicated pressure of the solenoid valve 33 that functions as a pressurization valve, (g) illustrates a time change of an indicated pressure of the solenoid valves 35 (that is, solenoid valves 35 of the pressure adjusting units 34RL and 34RR) that function as holding valves on the rear side, and (h) illustrates a time change of an indicated pressure of the solenoid valves 36 (that is, solenoid valves 36 of the pressure adjusting units 34RL and 34RR) that function as pressure reducing valves on the rear side. In addition, in FIG. 3, (i) illustrates a time change of a drive state (ON/OFF) of the pump motor 40.

In an example of FIG. 3, the hydraulic brake operation starts at a timing t1, and thereby the load on the front wheels and the load on the rear wheels start increasing (refer to L1, L2, and L3). The load on the front wheels increases to a load f1 in response to the hydraulic brake operation. Similarly, the load on the rear wheels increases to a load f2 in response to the hydraulic brake operation. The loads f1 and f2 are basically held as are, as long as the hydraulic brake operation is not canceled. Hereinafter, the load f1 of the front wheels, which is held in response to the hydraulic brake operation, is smaller than a minimum required load F1 for maintaining the stationary state solely by the front wheels.

In an example of FIG. 3, the parking brake operation is performed at a timing t2 after the increase of the load on the front wheels and the load on the rear wheels is ended (refer to L4). Here, as described above, at the timing t2, the load f1 of the front wheels, which is held in response to the hydraulic brake operation, is smaller than the minimum required load F1 (hereinafter, described as the required load F1) for maintaining the stationary state solely by the front wheels. Hence, the control unit 102 starts to drive, at the timing t2, the solenoid valves 33 as the pressurization valves, the solenoid valves 35 (that is, solenoid valves 35 of the pressure adjusting units 34RL and 34RR) as the holding valves on the rear side, the solenoid valves 36 (that is, solenoid valves 36 of the pressure adjusting units 34RL and 34RR) as pressure reducing valves on the rear side, and the pump motor 40. In this manner, the control unit starts the control of reducing the hydraulic braking force of the rear wheels and the control of increasing the hydraulic braking force of the front wheels.

More specifically, the control unit 102 starts to drive the pump motor 40 and gradually increases the indicated pressure of the solenoid valve 33 as the pressurization valve, thereby, gradually increasing the hydraulic braking force of the front wheels to a magnitude corresponding to the required load F1 (refer to L1, L6, and L9). Simultaneously, the control unit 102 rapidly increases the indicated pressure of the solenoid valves 35 as the holding valves, thereby, preventing the hydraulic braking force of the rear wheels from increasing to a value larger than a current value, and the control unit opens the solenoid valves 36 as the pressure reducing valves, thereby, reducing the hydraulic braking force of the rear wheels to zero (refer to L2, L7, and L8). As a result, the load on the front wheels increases to the required load F1 at a timing t3, and the load on the rear wheels decreases to zero at a timing t4. Incidentally, the solenoid valves 36 as the pressure reducing valves are closed at the timing t4.

Incidentally, when the load on the front wheels increases to the required load F1, the load on the front wheels is held as is until the control of the solenoid valves 33 and the pump motor 40 by the control unit 102 is canceled (refer to L1). Similarly, when the load on the rear wheels decreases to zero, the load on the rear wheels is held as is until the control of the solenoid valves 35 and the pump motor 40 by the control unit 102 is canceled (refer to L2). Here, in the embodiment, the timing t3 at which the load on the front wheels reaches the required load F1 is set to be earlier than the timing t4 at which the load on the rear wheels reaches to zero. Consequently, the hydraulic braking force of the rear wheels becomes zero before the hydraulic braking force of the front wheels increases to a required magnitude, and thereby it is possible to prevent the vehicle from moving.

In the example of FIG. 3, at the timing t4 when the load on the rear wheels decreases to zero, a current starts flowing to the EPB motor 60 (refer to L5). Incidentally, the current of the EPB motor 60 rapidly increases as inrush current, then, decreases approximately to zero again, and starts to gradually increase from a timing t5 after a predetermined delay time that unavoidably occurs in the mechanism of the electric parking brake 2 elapses. Consequently, the electric parking brake 2 starts generating the parking brake force on the rear wheels at the timing t5, and thereby the load on the rear wheels starts increasing (refer to L2). The load on the rear wheels increases to a minimum required load F2 (hereinafter, described as the required load F2) for maintaining the stationary state solely by the rear wheels. Then, the driving of the EPB motor 60 is stopped at a timing t6 when the load on the rear wheels reaches the required load F2. Consequently, the parking brake force of the rear wheels is held to the magnitude corresponding to the required load F2, and thus it is possible to maintain the stationary state solely by the parking brake force of the rear wheels.

As described above, when it is possible to maintain the stationary state solely by the parking brake force of the rear wheels, the adjustment of the hydraulic braking force started at the timing t2, that is, the control of increasing the hydraulic braking force of the front wheels while reducing the hydraulic braking force of the rear wheels is canceled. Specifically, in the example of FIG. 3, at the timing t6 when the load on the rear wheels increases to the required load F2, the indicated pressure of the solenoid valve 33 as the pressurization valve is gradually reduced, and the indicated pressure of the solenoid valves 35 as the holding valves on the rear side is gradually reduced (refer to L2, L6, and L7). Then, at a timing t7 when the indicated pressures of the solenoid valves 33 and 35 are reduced to zero, the driving of the pump motor 40 is stopped.

Incidentally, in the example of FIG. 3, at the timing t6 at which the control of increasing the hydraulic braking force of the front wheels while decreasing the hydraulic braking force of the rear wheels starts to be canceled, the hydraulic brake operation is still performed (refer to L3). Hence, when the load is considered as usual, the load in response to the hydraulic brake operation, which is different from the load in response to the parking brake force, is generated on the rear wheels after the timing t6 (refer to a dot-and-dash line L20). However, as described above, in general, after the parking brake force completely increases and is held, the mechanisms of the hydraulic brake 1 and the electric parking brake 2 do not allow the hydraulic braking force in response to the hydraulic brake operation to be added to the parking brake force and to be generated as the load on the rear wheels, even when the driver performs the hydraulic brake operation. Hence, in the example of FIG. 3, the load on the rear wheels does not increase to the required load F2 or larger after the timing t6 (refer to L2). Then, in the example of FIG. 3, the stationary state is realized solely by the parking brake force of the rear wheels at a timing t8 when the hydraulic brake operation is completely canceled.

Next, an operation of the brake control device 100 according to the embodiment will be described in detail.

Figure 4:
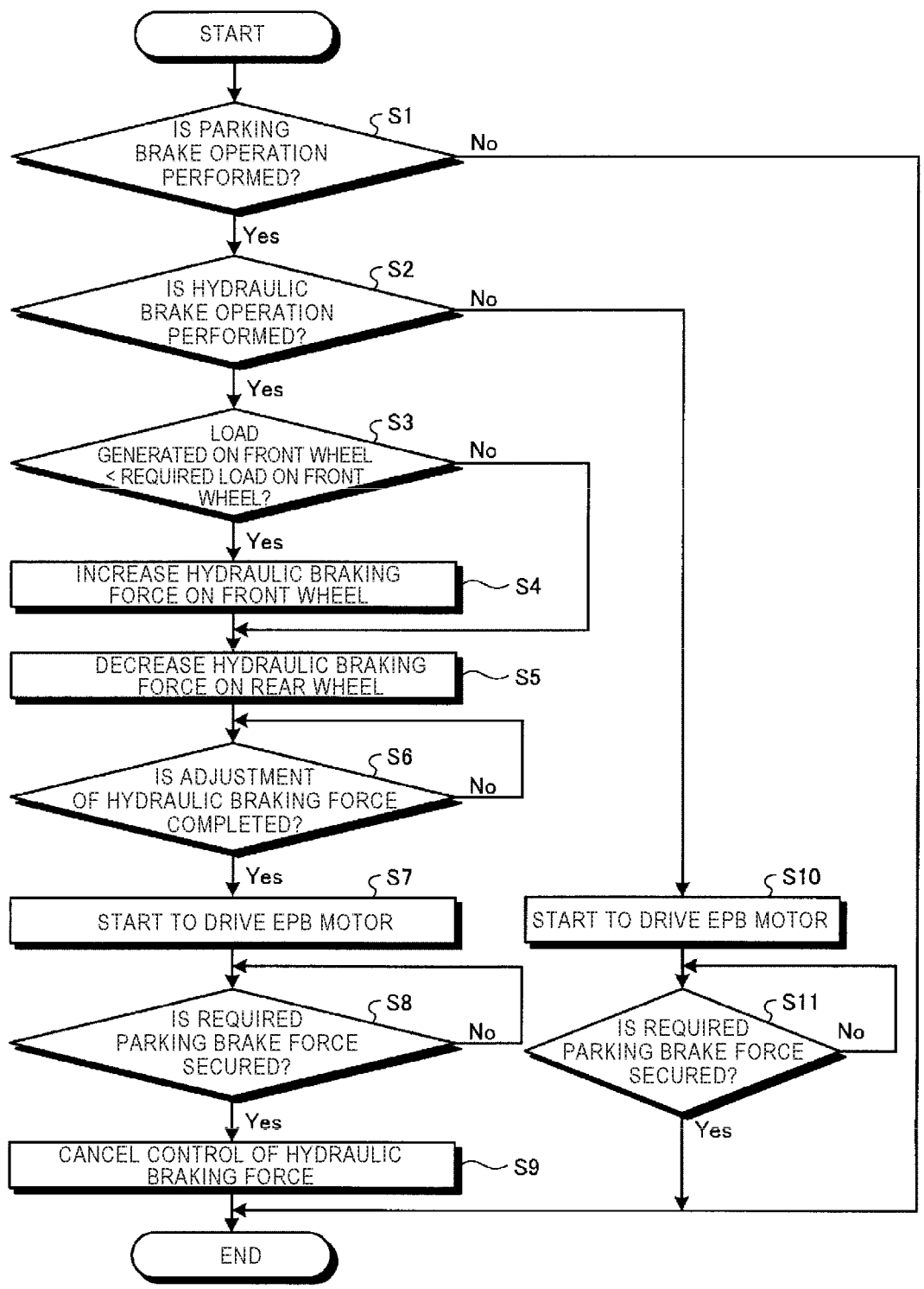
FIG. 4 is an exemplary flowchart illustrating a series of processes that is executed by the brake control device according to the embodiment.

FIG. 4 is an exemplary flowchart illustrating a series of processes that is executed by the brake control device 100 according to the embodiment.

In a process flow of FIG. 4, first, in 51, the detection unit 101 determines whether or not the parking brake operation is performed, that is, whether or not the electric signal in response to an operation of the EPB switch or the lever described above is detected. This process of 51 is repeated until the detection unit determines that the parking brake operation is performed. Then, when the detection unit determines that the parking brake operation is performed in 51, the process proceeds to S2.

In S2, the detection unit 101 determines whether or not the hydraulic brake operation is performed, that is, whether or not stepping on the brake pedal is performed. In S2, when the detection unit determines that the hydraulic brake operation is performed, the process proceeds to S3.

In S3, the control unit 102 determines whether or not the load generated on the front wheels in response to the hydraulic brake operation is smaller than the minimum required load (required load F1 in FIG. 3) for maintaining the stationary state solely by the hydraulic braking force of the front wheels.

In S3, when the control unit determines that the load generated on the front wheels is smaller than the required load, the process proceeds to S4. Then, in S4, the control unit 102 increases the hydraulic braking force of the front wheels such that the load generated on the front wheels reaches the required load. Then, in S5, the control unit 102 decreases the hydraulic braking force of the rear wheels such that the load generated on the rear wheels becomes zero.

Incidentally, in S3, when the control unit determines that the load generated on the front wheels is equal to or larger than the required load, the process of S4 is not executed, and the process proceeds to S5. In other words, when the control unit determines that the load generated on the front wheels is equal to or larger than the required load in S3, the control unit 102 does not execute the process of increasing the hydraulic braking force of the front wheels but executes the process of decreasing the hydraulic braking force of the rear wheels.

In S6, the control unit 102 determines whether or not the adjustment of the hydraulic braking force is completed by the processes of S4 and S5 (or only the process of S5) described above. In other words, in S6, the control unit 102 determines whether or not the load on the front wheels increases to the required load, and the load on the rear wheels decreases to zero. This process of S6 is repeated until the control unit determines that the adjustment of the hydraulic braking force is completed. Then, when the control unit determines that the adjustment of the hydraulic braking force is completed in S6, the process proceeds to S7.

In S7, the control unit 102 starts to drive the EPB motor 60. Consequently, the electric parking brake 2 starts to actually generate the parking brake force over an elapse of the predetermined delay time that unavoidably occurs in the mechanism thereof.

In S8, the control unit 102 determines whether or not the parking brake force required for maintaining the stationary state is secured. In other words, in S8, the control unit 102 determines whether or not the load generated on the rear wheels increases to the minimum required load (required load F2 in FIG. 3) for maintaining the stationary state solely by the parking brake force of the rear wheels. This process of S8 is repeated until the control unit determines that the required parking brake force is secured. Then, when the control unit determines that the required parking brake force is secured in S8, the process proceeds to S9.

In S9, the control unit 102 cancels the control of the hydraulic braking forces of the front wheels and the rear wheels, which has been started in S4 and S5, (or control of the hydraulic braking force of only the rear wheels, which has been started in S5, with S4 having been skipped). Consequently, it is possible to perform complete transition from the stationary state by the hydraulic braking forces of the front wheels and the rear wheels to the stationary state solely by the parking brake force of the rear wheels. Then, the process is ended.

Incidentally, in S2, a case in which the detection unit determines that the hydraulic brake operation is not performed is considered. In this case, the hydraulic braking force of the front wheels and the rear wheels is not generated, and thus it is necessary to rapidly generate the parking brake force. Hence, when the detection unit determines that the hydraulic brake operation is not performed in S2, processes of S10 and S11 similar to S7 and S8 are executed. Then, as a result of executing the processes of S10 and S11, it is possible to maintain the stationary state solely by the parking brake force of the rear wheels, and thus the process is ended.

As described above, the control unit 102 according to the embodiment reduces the hydraulic braking force generated on the rear wheels and adjusts the hydraulic braking force generated on the front wheels to a magnitude that allows the stationary state of the vehicle to be maintained, before the parking brake force is generated by the electric parking brake 2, when the parking brake operation is detected while the stationary state is being maintained solely by the hydraulic braking force generated on both the front and rear wheels. Consequently, even when the hydraulic braking force of the rear wheels is zero, for example, it is possible to maintain the stationary state solely by the hydraulic braking force of the front wheels. Hence, it is possible to decrease the load due to the overlapped generation of the hydraulic braking force and the parking brake force on the rear wheels while the stationary state is more reliably maintained.

In addition, as described above, the control unit 102 according to the embodiment causes the electric parking brake 2 to generate the parking brake force after the hydraulic braking force generated on the rear wheels is reduced to zero. Consequently, it is possible to more reliably avoid the overlapped generation of the hydraulic braking force and the parking brake force on the rear wheels.

In addition, as described above, the control unit 102 according to the embodiment cancels the control of reducing the hydraulic braking force of the rear wheels and the control of adjusting the hydraulic braking force of the front wheels, when the magnitude of the parking brake force of the rear wheels reaches the magnitude that allows the stationary state to be maintained solely by the parking brake force. Consequently, the control of reducing the hydraulic braking force of the rear wheels is canceled, and thereby it is possible to decrease the unnecessary control burden. In addition, the control of adjusting the hydraulic braking force of the front wheels is canceled, and thereby it is possible to limit applying of an unnecessary load to the brake mechanism of the front wheels.

In addition, as described above, the control unit 102 according to the embodiment omits the adjustment of the hydraulic braking force of the front wheels and decreases the hydraulic braking force of the rear wheels when the magnitude of the hydraulic braking force of the front wheels is equal to or larger than the magnitude that allows the stationary state to be maintained, in a case where the parking brake operation is detected while the stationary state is being maintained solely by the hydraulic braking force. Consequently, the hydraulic braking force of the front wheels is not adjusted, when the sufficient hydraulic braking force is already secured to maintain the stationary state. Hence, it is possible to decrease the unnecessary control burden.

Incidentally, as described above, the control unit 102 according to the embodiment may control the timing at which the EPB motor 60 is driven such that the timing at which the hydraulic braking force generated on the rear wheels is reduced to zero coincides with the timing at which the parking brake force starts to be generated. As described above, the control of the timings allows a rapid transition from the stationary state solely by the hydraulic braking force to the stationary state solely by the parking brake force.

As described above, the embodiment of the invention is described; however, the embodiment is described as only an example and is not provided to limit the scope of the invention. The novel embodiment described above can be realized in various aspects, and various omissions, replacements, or modifications can be performed within a range without departing from the gist of the invention. In addition, the embodiment and modifications thereof described above are included in the scope or the gist of the invention and are included in the inventions and the scope equivalent to the inventions described in claims.

The invention claimed is:

1. A brake control device that controls a hydraulic brake capable of generating a hydraulic braking force on both front and rear wheels of a vehicle and an electric parking brake capable of generating a parking brake force, which is different from the hydraulic braking force, on one of the front wheels or the rear wheels, the brake control device comprising:
   a detection unit for detecting a parking brake operation for causing the electric parking brake to generate a parking brake force; and
   a control unit for reducing the hydraulic braking force generated on the wheels equipped with the electric parking brake and increasing the hydraulic braking force generated on other of the front wheels or the rear wheels not equipped with the electric parking brake to a magnitude that allows a stationary state of the vehicle to be maintained, before the parking brake force is generated by the electric parking brake, when the parking brake operation is detected while the stationary state is being maintained solely by the hydraulic braking force generated on both the front and rear wheels.

2. The brake control device according to claim 1, wherein the control unit causes the electric parking brake to generate the parking brake force after the hydraulic braking force generated on the wheels equipped with the electric parking brake is reduced to zero.

3. The brake control device according to claim 2, wherein the control unit cancels control of reducing the hydraulic braking force generated on the wheels equipped with the electric parking brake and control of increasing the hydraulic braking force generated on the wheels not equipped with the electric parking brake, when a magnitude of the parking brake force reaches a magnitude that allows the stationary state to be maintained solely by the parking brake force.

4. The brake control device according to claim 1, wherein the control unit omits increasing the hydraulic braking force generated on the wheels not equipped with the electric parking brake when the magnitude of the hydraulic braking force generated on the wheels not equipped with the electric parking brake is equal to or larger than the magnitude that allows the stationary state to be maintained.

5. The brake control device according to claim 2, wherein the control unit omits increasing the hydraulic braking force generated on the wheels not equipped with the electric parking brake when the magnitude of the hydraulic braking force generated on the wheels not equipped with the electric parking brake is equal to or larger than the magnitude that allows the stationary state to be maintained.

6. The brake control device according to claim 3, wherein the control unit omits increasing the hydraulic braking force generated on the wheels not equipped with the electric parking brake when the magnitude of the hydraulic braking force generated on the wheels not equipped with the electric parking brake is equal to or larger than the magnitude that allows the stationary state to be maintained.

* * * * *